(12) United States Patent
Lin et al.

(10) Patent No.: US 9,275,674 B2
(45) Date of Patent: Mar. 1, 2016

(54) SPINDLE MOTOR FOR HARD DISK DRIVE AND METHOD OF FABRICATION THEREOF

(71) Applicant: Marvell International LTD., Hamilton (BM)

(72) Inventors: Ming Chou Lin, Singapore (SG); Mengjun Liu, Singapore (SG); Quan Jiang, Singapore (SG)

(73) Assignee: Marvell International Ltd., Hamilton (BM)

(*) Notice: Subject to any disclaimer, the term of this patent is extended or adjusted under 35 U.S.C. 154(b) by 0 days.

(21) Appl. No.: 14/644,900

(22) Filed: Mar. 11, 2015

(65) Prior Publication Data

US 2015/0262610 A1 Sep. 17, 2015

(30) Foreign Application Priority Data

Mar. 11, 2014 (SG) .......................... 10201400541V

(51) Int. Cl.

| | |
|---|---|
| *G11B 19/20* | (2006.01) |
| *H02K 3/26* | (2006.01) |
| *H02K 3/28* | (2006.01) |
| *H02K 1/27* | (2006.01) |
| *H02K 15/00* | (2006.01) |

(52) U.S. Cl.
CPC .......... *G11B 19/2009* (2013.01); *H02K 1/2793* (2013.01); *H02K 3/26* (2013.01); *H02K 3/28* (2013.01); *H02K 15/00* (2013.01)

(58) Field of Classification Search
CPC ....... G11B 19/2009; H02K 3/28; H02K 3/26; H02K 1/2793; H02K 15/00; H02K 29/08; H02K 21/24
USPC ................ 360/99.07, 99.08, 99.12; 310/67 R
See application file for complete search history.

(56) References Cited

U.S. PATENT DOCUMENTS

| | | | | |
|---|---|---|---|---|
| 5,128,818 | A * | 7/1992 | Koizumi et al. | ............ 360/99.04 |
| 5,392,176 | A * | 2/1995 | Anderson | .................... 360/99.24 |
| 5,450,361 | A * | 9/1995 | Iwahashi et al. | ............... 365/200 |
| 5,796,193 | A * | 8/1998 | Sakano et al. | .............. 310/67 R |
| 8,659,850 | B2 * | 2/2014 | Himeno et al. | ............ 360/99.08 |
| 2014/0368079 | A1 * | 12/2014 | Wong et al. | .................... 310/208 |

* cited by examiner

*Primary Examiner* — Angel Castro

(57) ABSTRACT

A spindle motor for a hard disk drive includes a base and a bearing assembly coupled to the base. The bearing assembly includes a sleeve configured to rotatably support a shaft therein. A rotor hub is affixed to the shaft so as to be rotatable with the shaft about a rotational axis. A stator is arranged in between the rotor hub and the base. A first magnet is arranged over the stator and on a bottom surface of the rotor hub. In particular, the rotor hub includes a body portion, a peripheral wall portion extending from the body portion in a direction towards the base, and a flange portion having a disk seating surface configured for supporting one or more disks thereon. The peripheral wall portion is configured to at least partially surround the stator in a radial direction. There is also provided a method of fabricating the spindle motor and a hard disk drive incorporating the spindle motor.

23 Claims, 8 Drawing Sheets

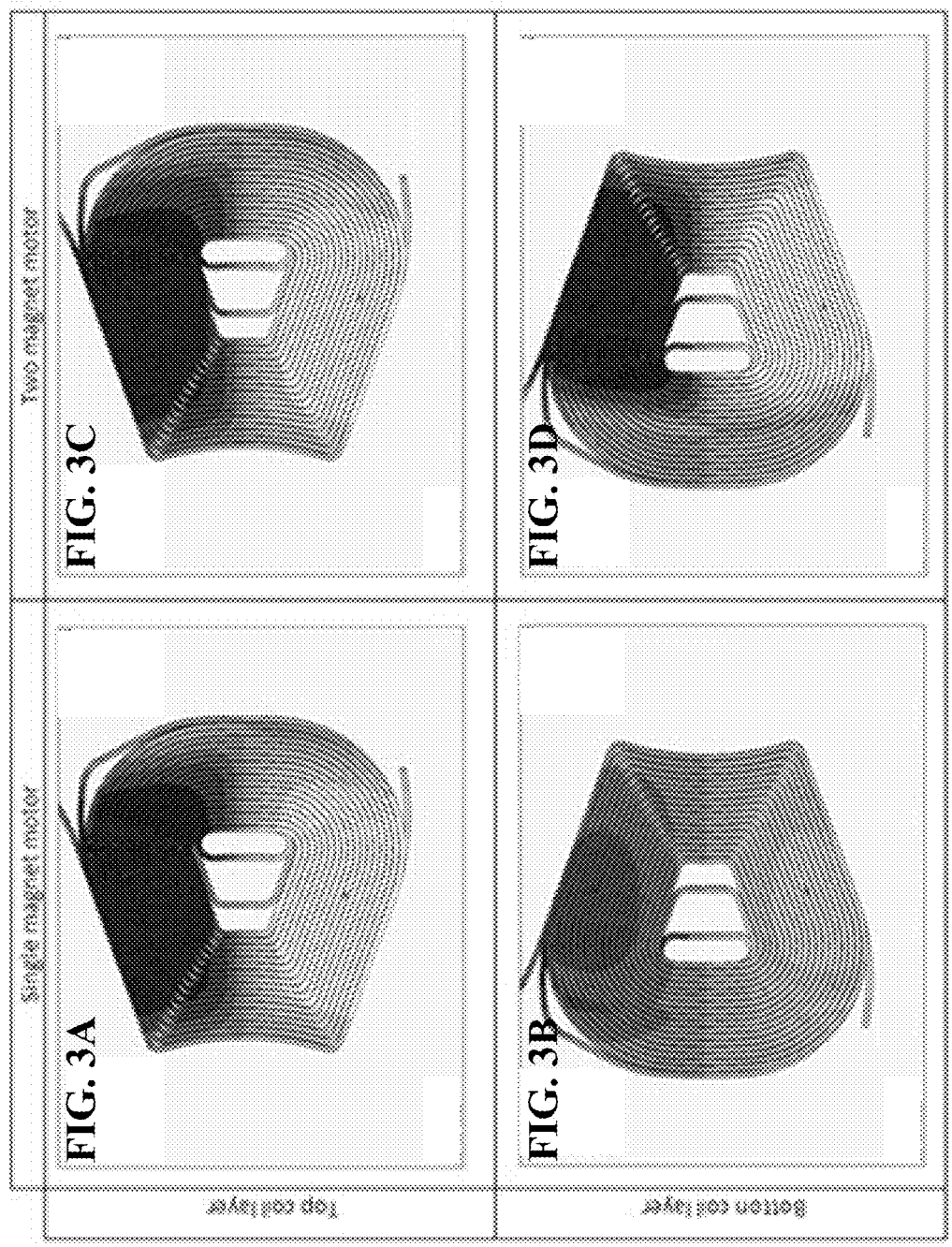

SPINDLE MOTOR FOR HARD DISK DRIVE AND METHOD OF FABRICATION THEREOF

CROSS-REFERENCE TO RELATED APPLICATION

This application claims the benefit of priority of Singapore Patent Application No. 10201400541V, filed 11 Mar. 2014, the contents of which being hereby incorporated by reference in its entirety for all purposes.

TECHNICAL FIELD

The present disclosure generally relates to a spindle motor for a hard disk drive and a method of fabrication thereof, and more particularly, to an axial field spindle motor for a small form factor hard disk drive (HDD).

BACKGROUND

The pervasive quest for ever-increasing data capacity for an ultra-small form factor hard drive (e.g. sub-7 mm) is conventionally limited to a single disk configuration. In order to accommodate an additional disk such as to increase data capacity within the same form factor height or vertical confinement (Z-height), it would require (i) physically lowering of the disk seating surface and (ii) additional electromagnetic force to shoulder the increased rotating load.

For the former, conventional axial field spindle designs usually require the coil or magnet polarity to be contained within the inner rotor hub periphery. The accommodation of another disk media within the same form factor height entails increasing height spacing (disk headroom) either on stator or rotor dimensions. However, this is not possible in a conventional axial field spindle motor due to the presence of the stator directly under the disk seating surface which would block the disk seating surface from being lowered. For ease of understanding, FIG. 1A illustrates a conventional axial field spindle motor 100 for a small form factor HDD and FIG. 1B illustrates a conventional deposited-on-coil substrate (stator) 110. From FIG. 1A, it can be seen that the disk seating surface 102 cannot be lowered in order to accommodate an additional disk due to the presence of an outer part of the stator 110 being in the way. In particular, the conventional stator 110 has a tab extension 120 protruding from the circular periphery (outer circumference) of the stator 110 on which contact pads for connecting with power lines are formed as shown in FIG. 1B. This tab extension 120 increases the span of the stator 120 in the radial direction and thus presents problems for the conventional axial field spindle 100 to accommodate additional disk(s) as explained above.

For the latter, the added load from the additional disk(s) and spacer(s) leads to a higher torque being required to rotate the entire assembly, thereby warranting more coil layers or turns but would be limited by magnetic flux leakage due to air gap penalty.

SUMMARY

A spindle motor for a hard disk drive includes a base and a bearing assembly coupled to the base. The bearing assembly includes a sleeve configured to rotatably support a shaft therein. A rotor hub is affixed to the shaft so as to be rotatable with the shaft about a rotational axis. A stator is arranged in between the rotor hub and the base. A first magnet is arranged over the stator and on a bottom surface of the rotor hub. The rotor hub includes a body portion, a peripheral wall portion extending from the body portion in a direction towards the base, and a flange portion having a disk seating surface configured for supporting one or more disks thereon. The peripheral wall portion is configured to at least partially surround the stator in a radial direction.

In other features, a plane of an upper surface of the body portion of the rotor hub and a plane of the disk seating surface defines height spacing therebetween. The peripheral wall portion is configured to extend in the direction towards the base to an extent sufficient for the height spacing to accommodate a plurality of disks.

In other features, the peripheral wall portion is configured to extend in the direction towards the base beyond the stator.

In other features, the stator comprises a substrate having a substantially circular planar cross-section and a plurality of coil windings formed on the substrate. A plurality of contacts configured for connecting with power lines are formed within an outer circumference of the substrate.

In other features, the plurality of contacts is formed between outer portions of adjacent coil windings.

In other features, the spindle motor further comprises a second magnet arranged to oppose or align with the first magnet. The stator is located between the first magnet and the second magnet.

In other features, the base comprises an outer protruding portion extending in a direction towards the rotor hub for supporting the stator. The stator is supported by the outer protruding portion at an outer peripheral portion of the stator.

In other features, a dimension of the second magnet is configured to define a predetermined radial gap to the outer protruding portion and/or a predetermined axial gap to the base for setting a magnetic preload to configure a bearing stiffness of the spindle motor.

In other features, the base comprises an inner protruding portion extending in a direction towards the rotor hub for supporting the stator. The stator is supported by the inner protruding portion at an inner peripheral portion of the stator.

In other features, a plurality of stators are affixed along the inner protruding portion of the base and a plurality of magnets are affixed along the outer peripheral wall portion of the rotor hub such that the plurality of stators and the plurality of magnets are interleaved alternately.

In other features, each of the plurality of magnets comprises one or more alignment markings on at least one of an outer periphery portion and an inner periphery portion thereof, and the plurality of magnets are aligned with each other to have the same polarity orientation.

A hard disk includes the spindle motor for rotating a disk disposed thereon. A magnetic head is configured to read data from and write data to the disk. An actuator arm has the magnetic head disposed thereon at a distal portion thereof. The actuator arm is configured to support and move the magnetic head to a desired position above the disk.

A method of fabricating a spindle motor for a hard disk drive includes providing a base; providing a bearing assembly coupled to the base, wherein the bearing assembly comprises a sleeve configured to rotatably support a shaft therein; providing a rotor hub affixed to the shaft so as to be rotatable with the shaft about a rotational axis; arranging a stator in between the rotor hub and the base; and arranging a first magnet over the stator and on a bottom surface of the rotor hub. The rotor hub comprises a body portion, a peripheral wall portion extending from the body portion in a direction towards the base, and a flange portion having a disk seating surface configured for supporting one or more disks thereon. The peripheral wall portion is configured to at least partially surround the stator in a radial direction.

In other features, a plane of an upper surface of the body portion of the rotor hub and a plane of the disk seating surface defines a height spacing therebetween. The peripheral wall portion is configured to extend in the direction towards the base to an extent sufficient for the height spacing to accommodate a plurality of disks.

In other features, the peripheral wall portion is configured to extend in the direction towards the base beyond the stator.

In other features, the method further comprises forming the stator to include a substrate having a substantially circular cross-section and a plurality of coil windings on the substrate, and forming a plurality of contacts configured for connecting with power lines and within an outer circumference of the substrate.

In other features, the plurality of contacts is formed between outer portions of adjacent coil windings.

In other features, the method further comprises arranging a second magnet to oppose or align with the first magnet. The stator is located between the first magnet and the second magnet.

In other features, the method further comprises forming the base to include an outer protruding portion extending in a direction towards the rotor hub for supporting the stator. The stator is supported by the outer protruding portion at an outer peripheral portion of the stator.

In other features, the method further comprises configuring a dimension of the second magnet to define a predetermined radial gap to the outer protruding portion and/or a predetermined axial gap to the base for setting a magnetic preload for the spindle motor bearing.

In other features, the base comprises an inner protruding portion extending in a direction towards the rotor hub for supporting the stator. The stator is supported by the inner protruding portion at an inner peripheral portion of the stator.

In other features, the method further comprises affixing a plurality of stators along the inner protruding portion of the base and affixing a plurality of magnets along the outer peripheral wall portion of the rotor hub such that the plurality of stators and the plurality of magnets are interleaved alternately.

In other features, the method further comprises forming one or more alignment markings on at least one of an outer periphery portion and an inner periphery portion of each of the plurality of magnets, and aligning the plurality of magnets with each other to have same polarity orientation.

BRIEF DESCRIPTION OF THE DRAWINGS

Examples of the present disclosure will be better understood and readily apparent from the following written description, by way of example only, and in conjunction with the drawings, in which:

FIGS. 3A to 3D depict the magnetic flux intensity map comparison between a single-magnet configuration and a two-magnet configuration;

DETAILED DESCRIPTION

In some examples, the present disclosure relates to a spindle motor for a hard disk drive (HDD) which advantageously overcomes the height limitation associated with conventional spindle motor as described in the background of the present specification. That is, the inability to lower the flange portion of the rotor hub comprising the disk seating surface in order to increase the disk headroom for accommodating additional disk(s). In particular, according to an example of the present disclosure, there is provided a "nested" stator (coil-on-substrate) which eliminates the tab extension required for electrical/power line interconnect in a conventional stator as described in the background with reference to FIG. 1B. This advantageously shortens the radial length of the stator, thus allowing the flange portion (comprising the disk seating surface) of the rotor hub to be lowered so as to increase the height spacing available for accommodating additional disk(s) thereon.

According to another example, a plurality of magnets (e.g., two or more magnets) is provided in the top and bottom rotors for recovering magnetic flux leakage in the HDD due to air gap penalty. According to a further example of the present disclosure, the dimensions of one or more magnets in the rotor are configured for setting a magnetic preload so as to configure or adjust a bearing stiffness of the spindle motor. This optimization of the magnetic preload advantageously allows a desired overall bearing stiffness to be achieved despite various types of bearing assembly and base insert designs having different pre-existing stiffness. Various examples of the present disclosure will now be described with reference to the accompanying drawings.

Figure 2A:
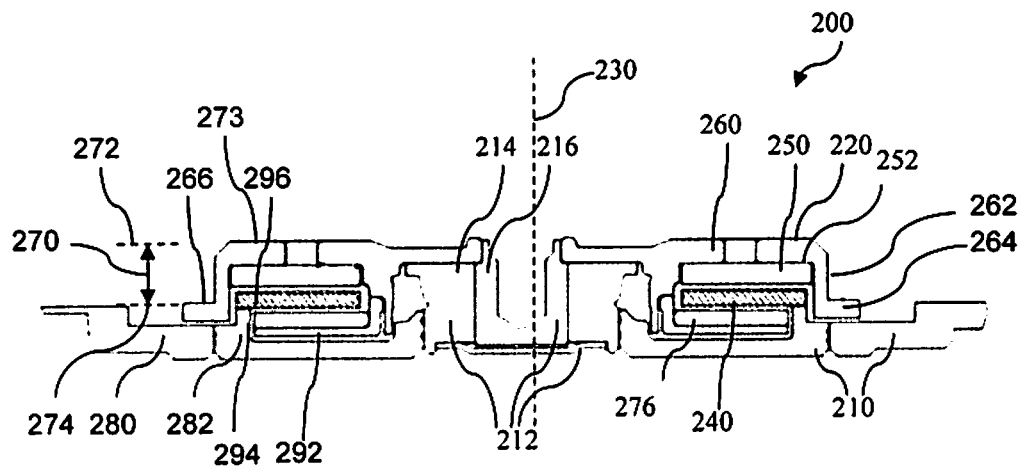
FIG. 2A depicts a schematic side cross-sectional view of a spindle motor 200 for a HDD according to an example of the present disclosure.

FIG. 2A depicts a schematic side cross-sectional view of a spindle motor 200 for a HDD according to an example of the present disclosure. The spindle motor 200 comprises a base 210, and a bearing assembly 212 coupled to the base 210, whereby the bearing assembly 212 comprises a sleeve 214 configured to rotatably support a shaft 216 therein. The spindle motor 200 further comprises a rotor hub 220 affixed to the shaft 216 so as to be rotatable with the shaft 216 about a rotational axis 230, a stator 240 arranged in between the rotor hub 220 and the base 210, and a first magnet (e.g., top magnet) 250 arranged over the stator 240 and under the rotor hub 220 (in particular, on a bottom surface 252 of the rotor hub 220). The rotor hub 220 comprises a body portion 260, a peripheral wall portion 262 extending from the body portion 260 in a direction towards the base 210, and a flange portion 264 having a disk seating surface 266 configured for supporting one or more disks (not shown) thereon.

As shown in FIG. 2A, the flange portion 264 extends outwardly from the peripheral wall portion 262 in a radial direction (i.e., in a direction perpendicular to the rotational axis 230). In particular, according to the example, the peripheral wall portion 262 is configured to at least partially surround the stator 240 in the radial direction. This advantageously lowers the flange portion 264 and thus the disk seating surface 266, thereby allowing more height spacing 270 for accommodating additional disk(s) on the disk seating surface 266. This can therefore increase the data capacity of the HDD without having to increase its form factor height. As explained with reference to FIG. 1A, it was not possible to lower the disk seating surface 266 in the conventional spindle motor 100 due to the presence of the stator 110 blocking the flange portion from being lowered.

Figure 1A:
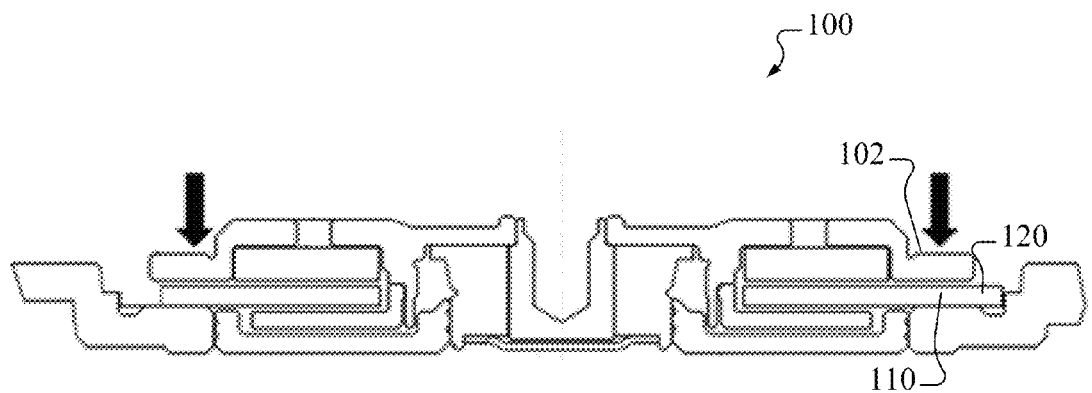
FIG. 1A depicts a conventional axial field spindle motor for a small form factor hard disk drive.

As shown in the example of FIG. 2A, the peripheral wall portion 262 may be configured to fully/completely surround the stator 240 in the radial direction. Therefore, the rotor hub 220 can be considered to be "nesting" the stator 240 and the stator 240 may thus be referred to as a "nested" stator. The height spacing 270 shown in FIG. 2A may be defined as between a plane 272 of an upper surface 273 of the body portion 260 of the rotor hub 220 and a plane 274 of the disk seating surface 266. In the example, the peripheral wall portion 262 is configured to extend in the direction towards the base 210 to an extent sufficient for the height spacing 270 to accommodate a plurality of disks. In particular, the peripheral wall portion 262 is configured to extend in the direction towards the base 210 beyond the stator 240 as shown in FIG. 2A. With this configuration, the height spacing 270 is at least doubled compared with the height spacing provided by the conventional spindle motor 100 as shown in FIG. 1A. Therefore, the height spacing 270 of the spindle motor 200 according to the example is advantageously able to accommodate two or more disks (not shown), thereby significantly increasing the data storage capacity of the HDD while maintaining its form height.

In the example of FIG. 2A, the spindle motor 200 is an axial field spindle motor for small form factor adoption in HDDs. For example, the bearing assembly 212 may be a fluid dynamic bearing (FDB). It will be appreciated that the present disclosure is not limited to using a FDB and other types of bearing assembly 212 may be used as appropriate such as hydrostatic bearing assembly or ball bearing assembly. For example, as will be described in an example later, the dimensions of one or more magnets in the rotor may be configured for setting a magnetic preload so as to configure or adjust an overall bearing stiffness of the spindle motor depending on the type or configuration of the bearing assembly and/or base insert used. The spindle motor 200 may further comprise a bottom rotor 276 arranged to oppose or align with the rotor hub 220 and having the stator 240 therebetween for providing magnetic loop closure of the magnetic flux passing from the first magnet 250 through the stator 240 and bottom rotor 276, and back via the rotor hub 220. In some examples, the base 210 comprises an outer base portion 280 and an inner base portion (or a base insert) 282 affixed between the bearing assembly 212 and the outer base portion 280 as shown in FIG. 2A.

In some examples, the stator coil substrate 240 does not carry an iron core and thus makes iron loss negligible. The rotor hub 220, together with the ring magnet (first magnet) 250, forms a rotating body spinning about the bearing assembly 212 when in operation. The bottom rotor 276 may either be affixed to the rotor hub 220 so as to rotate with the rotor hub 220 when the shaft 216 rotates (to eliminate eddy loss).

Figure 1B:
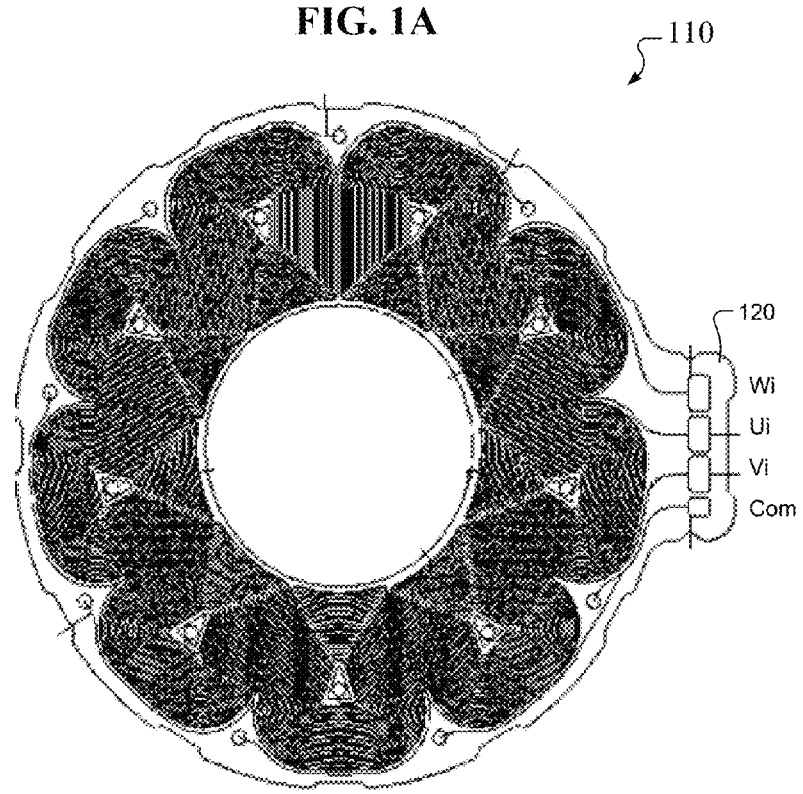
FIG. 1B depicts a conventional deposited-on-coil substrate (stator) in the conventional axial field spindle motor of FIG. 1A.
Figure 2B:
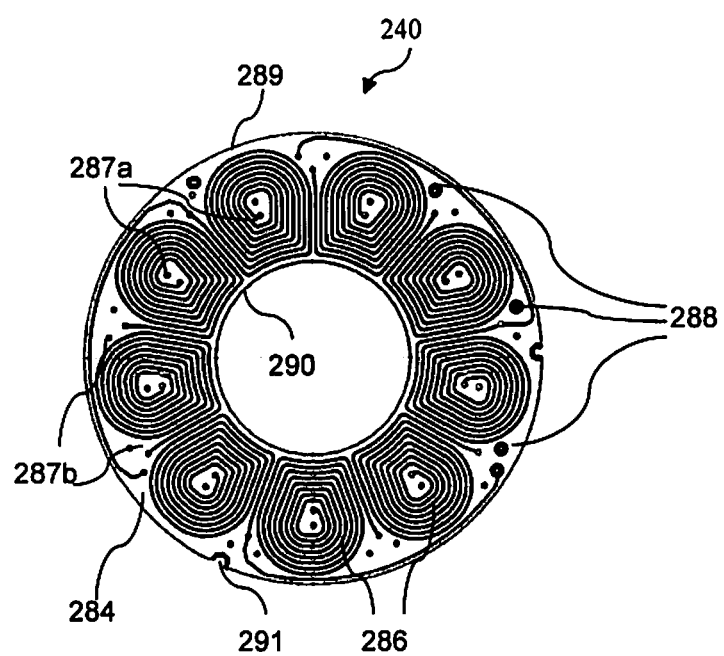
FIG. 2B depicts a schematic top cross-section of the stator (deposited-on-coil substrate) 240 of the spindle motor 200 according to an example of the present disclosure

FIG. 2B depicts a schematic top cross-section of the stator (deposited-on-coil substrate) 240 of the spindle motor 200 according to an example of the present disclosure. The stator 240 comprises a substrate 284 having a substantially circular planar cross-section and a plurality of phase/coil windings 286 formed on the substrate 284. In particular, in the example, the contacts 288 configured for connecting with power lines are formed on the substrate 284 and within an outer circumference 289 of the substrate 284. For example, the contacts 288 may be formed between outer portions of adjacent coil windings 286 as shown in FIG. 2B. Accordingly, the stator substrate 240 in the example advantageously eliminates the tab extension required in the conventional stator substrate 110 as shown in FIG. 1B. In an example, this is achieved by tweaking the winding profiles so as to allow sufficient space on the substrate 284 between outer portions of adjacent coil windings 286 as shown in FIG. 2B. The coil windings 286 are wound spirally in a predefined direction and are connected to adjacent coil layers of stator substrate 240 via the inner vias 287a or outer vias 287b.

With sufficient space available on the substrate 284, the electrical interconnect to the phase wires may be strategically accessed within the outer circumference 289 of the substrate 284. For example, straight pins (which may also serve as alignment pins) or wires can be connected to the contact pin holes 288 via the base 210/base insert 282. Furthermore, with the tab extension removed, the limit for adding multiple winding layers is also advantageously eliminated. This allows multiple winding layers to be formed in the stator 240 for generating additional electromagnetic force which may be required to shoulder increased rotating load due to additional disk(s) being accommodated by the spindle motor 200.

The winding profile is not limited to the configuration shown in FIG. 2B and other configurations may be implemented for creating spaces at various locations on the substrate 284 as desired or appropriate. For example, in another example of the present disclosure, the electrical contacts 288 may instead or also be located at the inner diameter portion 290 of the substrate 284. In this case, the winding profile would thus need to be configured accordingly to create sufficient space (not shown) at the inner diameter portion 290 of the substrate 284.

In one example, alignment markings 291 (e.g., cutouts or edge grooves) are formed on a periphery portion of the substrate 284, such as its outer periphery edge 290 as shown in FIG. 2B, to facilitate orientation/positioning of the substrate 284 during assembly for alignment purposes. The alignment markings 291 can instead or additionally be formed on other portion(s) of the substrate 284 as appropriate such as at the inner periphery edge 290.

In one example, the spindle motor 200 further comprises a second magnet (e.g., bottom magnet) 292 arranged to oppose or align with the first magnet 250, such that the stator 240 is located between the first and second magnets. That is, in contrast to using only a single magnet as for example shown in FIG. 1A, a top magnet 250 is disposed on a bottom surface of the rotor hub 220 and a bottom magnet 292 is disposed on a top surface of the bottom rotor 276 as shown in FIG. 2A according to the example. If it is desired to avoid increasing the form height of the HDD, the top and bottom magnets together may have substantially the same height as the single magnet (e.g., each of the top and bottom magnets may be half the height of the single magnet). Based on experiments conducted, it was found that having a top magnet 250 and a bottom magnet 292 advantageously compensate for air gap penalty, i.e., minimize magnetic flux loss crossing from the top magnet 250 to the bottom rotor 276, thereby sustaining magnetic flux across the air gap (between the rotor hub 220 and the bottom rotor 276).

For a better understanding and to demonstrate the effectiveness of the above-described two-magnet configuration, an experiment was conducted to compare the electromagnetic performances of the single-magnet configuration and two-magnet configuration. For the purpose of this experiment, the stator 240 and the magnets are configured as follow according to an example of the present disclosure:

Stator Configuration (for Both Single-Magnet and Two-Magnet Configurations)

9 coil windings per layer, 4 layers, 17 turns per coil windings (thus 68 turns per slot)

Trace width: 80 μm; trace height: 80 μm; trace gap: 15 μm, where the trace width and height defines the cross-section area of the coil and the trace gap defines as the radial coil-to-coil spacing within substrate layer Stator substrate (PCB) inner diameter (ID) and outer diameter (OD): 8 mm and 18.4 mm, respectively Substrate (PCB) thickness: 1.1 mm Single-Magnet Configuration ID and OD: 9 mm and 17 mm, respectively Thickness: 1.1 mm Two-Magnet Configuration Top Magnet ID and OD: 9 mm and 17 mm, respectively Thickness: 0.85 mm Bottom Magnet ID and OD: 9 mm and 15.8 mm, respectively Thickness: 0.85 mm The performances of the single-magnet configuration and two-magnet configuration under electromagnetic analysis are summarized in Table 1 below, which shows the electrical and mechanical torque constants (Kt, Km), as well as the spindle running current and power consumption.

TABLE 1

Summary of the performances of the single-magnet and two-magnet configurations

| Item, with sine-driver | Single magnet motor | 2-layer magnet motor |
|---|---|---|
| Phase Resistance (Ohm) | 3.54 | |
| Kt, mNm/A | 4.0 | 5.61 |
| Km, mNm/w^0.5 | 1.736 | 2.43 |
| Running current (mA) | 121.4 | 86.6 ↓ |
| Power consumption (W) | 0.353 | 0.315 ↓ |

From Table 1, it can be clearly observed that the two-magnet configuration exhibits superior torque constant values with lower running current and power consumption. Without wishing to be bound by theory, the reasons for the results shown in Table 1 may be explained by the magnetic flux intensity map shown in FIG. 3. For the single-magnet configuration, the magnetic flux density is highest across the top-most coil layer closest to the magnet as can be seen from FIG. 3A. However, as shown in FIG. 3B, the single-magnet configuration suffers from significant magnetic flux loss at the bottom-most coil layer furthest from the magnet. This magnetic flux loss may be referred to as the air gap penalty. In contrast, for the two-magnet configuration having aligned poles, the magnetic flux density/coverage at both the top-most coil layer and bottom-most coil layer is substantially uniform as shown in FIGS. 3C and 3D. It was also found that the magnet flux density fluctuates about ±0.484 Tesla and ±0.556 Tesla for the single-magnet and two-magnet configurations, respectively. Accordingly, it can be seen that the additional magnet 292 advantageously compensates for the air gap penalty in the rotor.

In the example of FIG. 2A, it can be seen that the base 210 comprises an outer protruding portion 294 extending in a direction towards the rotor hub 220 (e.g., in a direction parallel to the rotational axis 230) for supporting the stator 240. In particular, the stator 240 is supported by the outer protruding portion 294 at an outer peripheral portion (or outer diameter portion) 296 of the stator 240. In some examples, the outer protruding portion 294 protrudes from an outer periphery portion of the base insert 282 as shown in FIG. 2A.

Figure 4:
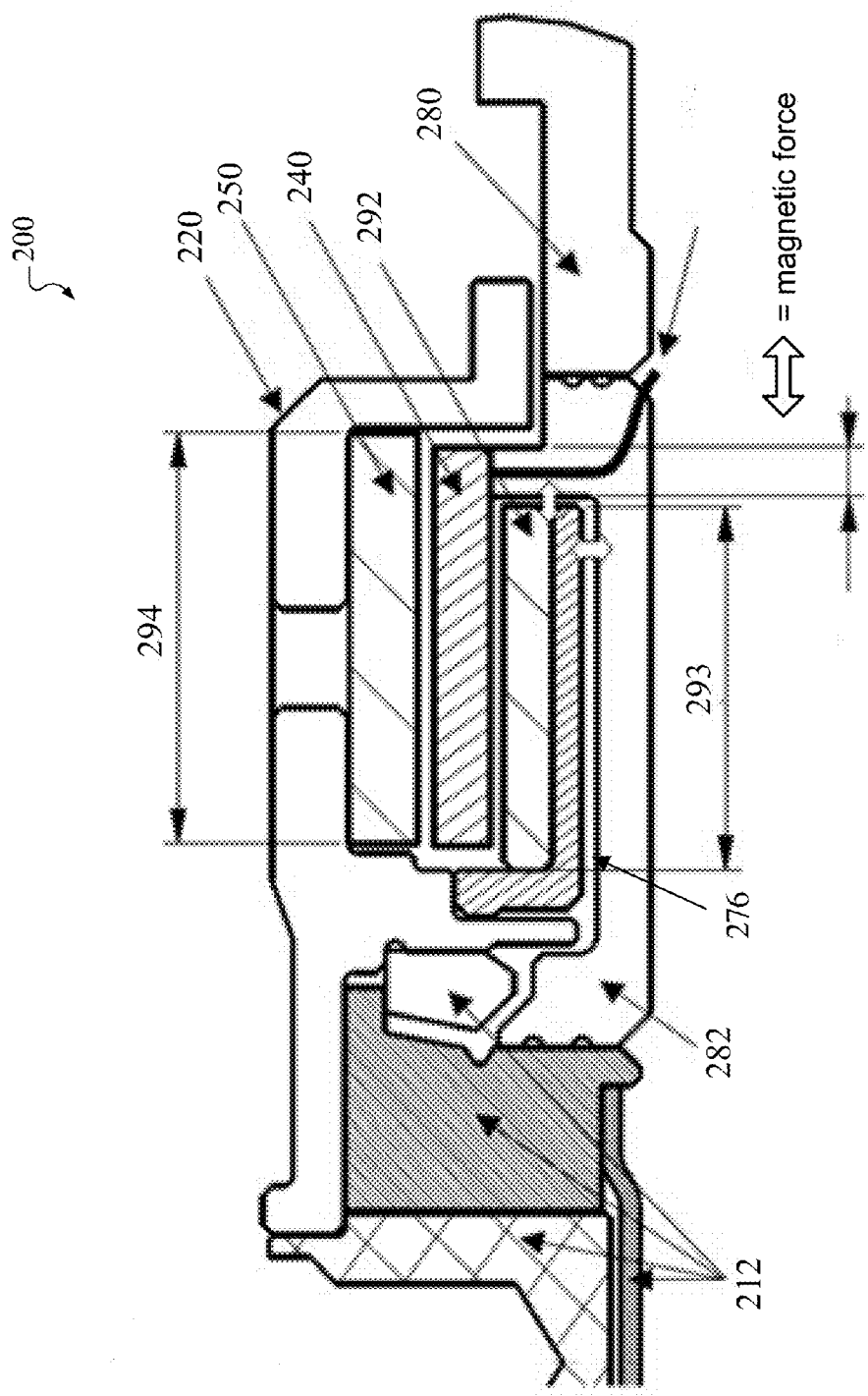
FIG. 4 depicts a schematic close-up cross-sectional view of a section of the spindle motor shown in FIG. 2A.

With the outer protruding portion 294, in addition to supporting the stator 240, it is possible to configure the dimension of second magnet (bottom magnet) 292 to define a predetermined radial gap to the outer protruding portion 294 and/or a predetermined axial gap to the base 210 (or base inlet 282) for setting a magnetic preload for the spindle motor bearing (i.e., to affect or configure the bearing stiffness of the spindle motor 200) as illustrated in FIG. 4. For example, most HDD spindle devices, spinstands or testers adopt fluid dynamic bearings or even hydrostatic bearings. These lightly loaded bearings are usually lower in stiffness than conventional ball bearings. The stiffness of the bearings is related to flying height robustness, especially for HDD devices which are prone to environment disturbances such as shock, vibration or handling and is dependent on multiple factors such as the design, mass, type (e.g. single fluid-film thrust or conical type), groove pressure clearances, oil viscosity and so on. In addition, bearing fly height may vary according to type and design of the bearing assembly.

In one example, additional stiffness may be sought via magnetic attraction/preloading that takes place between the rotating bottom magnet 292/rotor 276 and the non-rotating ferromagnetic base insert 282. For example, by altering the arc length 293 of the bottom magnet 292 and hence the radial and axial air gaps, a desired magnetic preload may be achieved to complement the load stiffness of the bearing assembly 212 (i.e., allowing different amount of axial and radial magnetic preloading through magnetic attraction across the air gaps). In the case where no additional magnetic preload is required, the base insert 282 may even be rendered non-ferromagnetic such as using 300 series stainless steel or a substantially magnetically-softer material such as A1100 aluminum.

For example, FDB bearings are different across different HDD market segments, that is, most HDD spindle devices do not necessarily adopt the same type of FDB, and thus the bearing stiffness requirements may differ. Higher-end or enterprise HDD tends to adopt balanced stiffness bearings like conical type bearings (typically of balanced stiffness at a cost premium), whereas lower-tier offerings or mobile or desktop segments may favor cheaper SFT-type bearings with biased stiffness. Therefore, this example advantageously enables the dimension of the bottom magnet 292 to be configured (for example, by adjusting the arc length 293 of the bottom magnet 292 to set the radial and axial air gaps as described above) for setting a desired magnetic preload for affecting/complementing the pre-existing bearing stiffness to achieve a desired overall bearing stiffness. Accordingly, a desired overall bearing stiffness of the spindle motor 200 can be achieved according to the example despite different pre-existing stiffness with various types of bearing assembly and base inserts. Based on this, the performance and reliability of HDD across all market segments may be improved. In an example, the top magnet 250 may also be configured together with the bottom magnet 292 for magnetic preload optimization such as by adjusting its arc length 294.

Based on the above disclosure, the radial gap and the axial gap may be set as appropriate to achieve a desired overall bearing stiffness. It is also appreciated that the radial gap and the axial gap for achieving the desired overall bearing stiffness depends on various properties and dimensions of the spindle motor 200. By way of example only and without limitation, the predetermined radial gap may be in the range of about 0.05 mm to about 1 mm and the predetermined axial gap may be in the range of about 0.05 mm or more.

Figure 5:
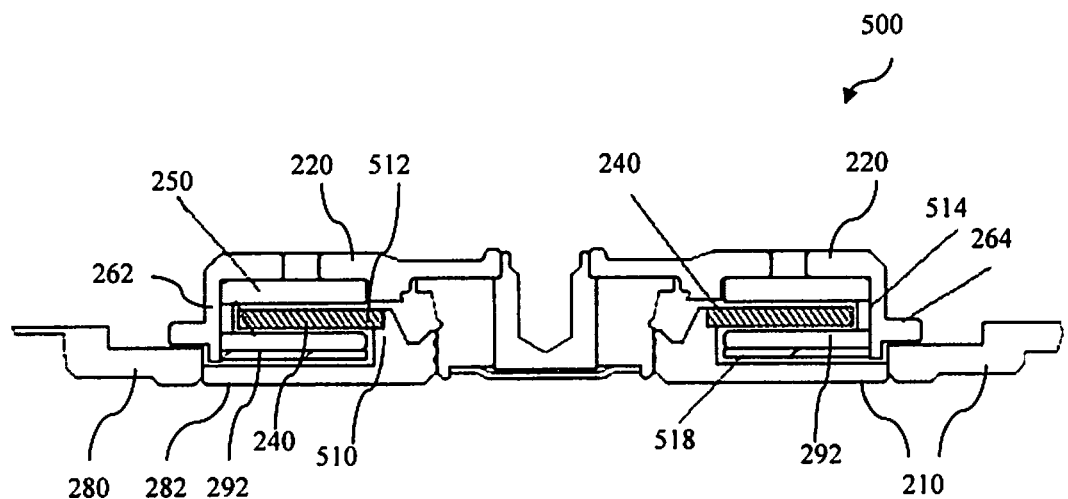
FIG. 5 depicts a schematic side cross-sectional view of a spindle motor according to another example of the present disclosure.

FIG. 5 depicts a schematic side cross-sectional view of a spindle motor 500 according to another example of the present disclosure. In this example, instead of the base 210 having an outer protruding portion 294 for supporting the stator 240 as shown in FIGS. 2A and 4, the base 210 comprises an inner protruding portion 510 extending in a direction towards the rotor hub 220 for supporting the stator 240. In this case, the stator 240 is supported by the inner protruding portion 510 at an inner peripheral portion (or inner diameter portion) 512 of the stator 240, and the bottom magnet 292 is supported on the peripheral wall portion 262 as shown in FIG. 5. A ring spacer 514 may be used to separate the top and bottom magnets. In this example, the bottom rotor 518 may be modified from an L-shaped disc as shown in FIGS. 2A and 4 to a flat-shaped disc as shown in FIG. 5. To secure the bottom rotor 518, the bottom rotor 518 may be affixed to the bottom surface of the bottom-most magnet by adhesive.

Figure 6:
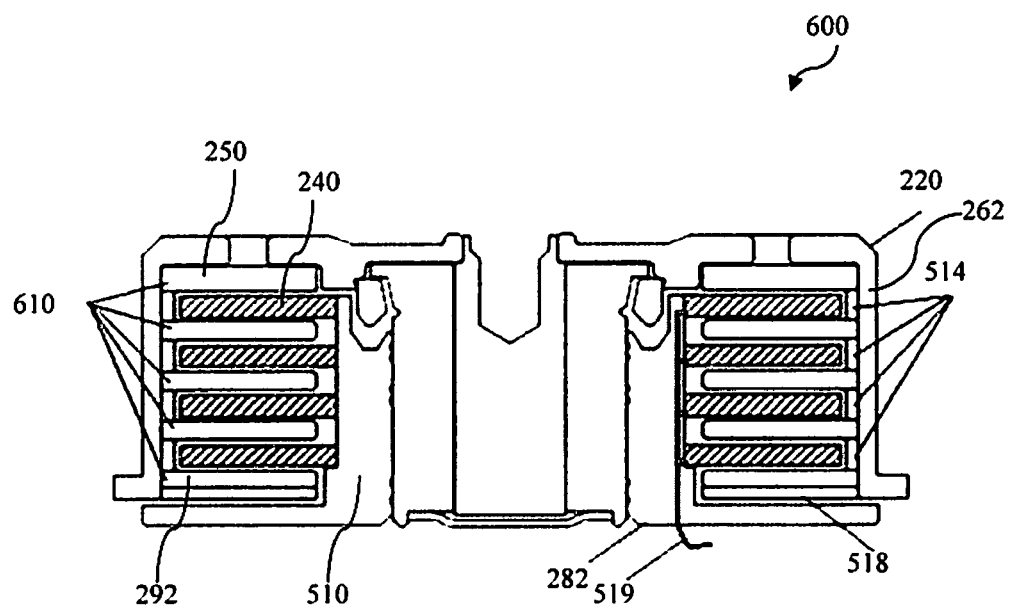
FIG. 6 depicts a schematic side cross-sectional view of a spindle motor according to another example of the present disclosure with modular stacking of multiple magnets and stators.

The above configuration advantageously allows for modular expansion of the spindle motor such as modular stacking of the magnets/stators for generating additional electromagnetic force to shoulder the increased rotating load if necessary. For example, FIG. 6 depicts a schematic side cross-sectional view of a spindle motor 600 according to another example of the present disclosure with modular stacking of multiple magnets 610 and stators 240. In particular, a plurality of stators 240 are affixed along the inner protruding portion 510 of the base 210 (e.g., base insert 282) and a plurality of magnets 610 are affixed along the outer peripheral wall portion 262 of the rotor hub 220 such that the plurality of stators 240 and the plurality of magnets 610 are interleaved alternately as shown in FIG. 6. Multiple ring separators or spacers 514 may be used to separate the magnets 610. An advantage of this configuration is that it allows the interconnect zone to be extended to the inner edge as pads since the spatial clearance is no longer subjected to rotational part interference. For example, as illustrated in FIG. 6, an interconnecting conductor 519 linking common phase lead wire for each stator 240 may be designed into the inner protruding portion 510 of the base 210.

Figure 7:
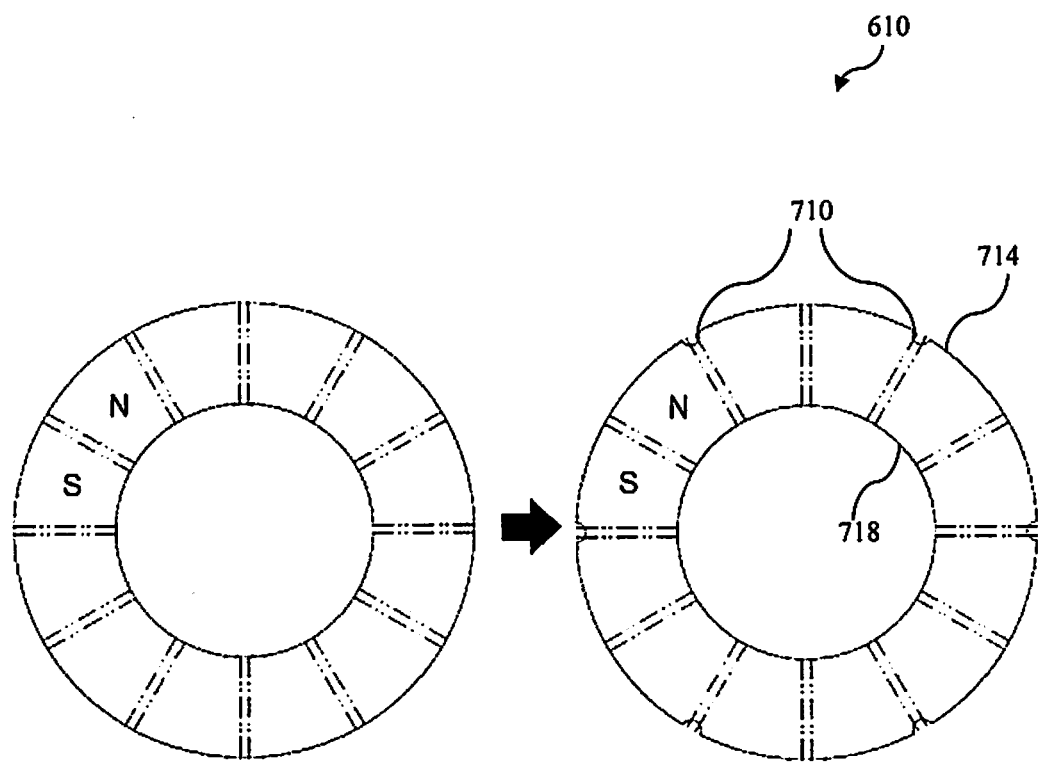
FIG. 7 depicts a schematic top planar cross-sectional view of a magnet having alignment markings at its outer periphery portion.

In some examples, for the spindle motor 600 with multiple-stacked stators and magnets, each of the plurality of magnets 610 comprises one or more alignment markings 710 on at least one of an outer periphery portion 714 and an inner periphery portion 718 thereof. This is to facilitate orientation/positioning of the magnets 610 during assembly for alignment purposes. For illustration only, FIG. 7 depicts a schematic top planar cross-sectional view of a magnet 610 having alignment markings 710 at its outer periphery portion 714. For example, the alignment markings 710 may be cutouts, edge notches/grooves or any other types of alignment markings as appropriate. In some examples, the alignment markings 710 are spaced in pole-pair intervals and defined at a neutral zone (i.e. a non-magnetic zone created due to nullifying polarity fields) to minimize flux eccentricity transiting between polarities during operation. For the assembling of magnets 610 to the spindle, the magnets 610 are physically aligned to have the same polarity orientation using the alignment features 710.

Figure 8:
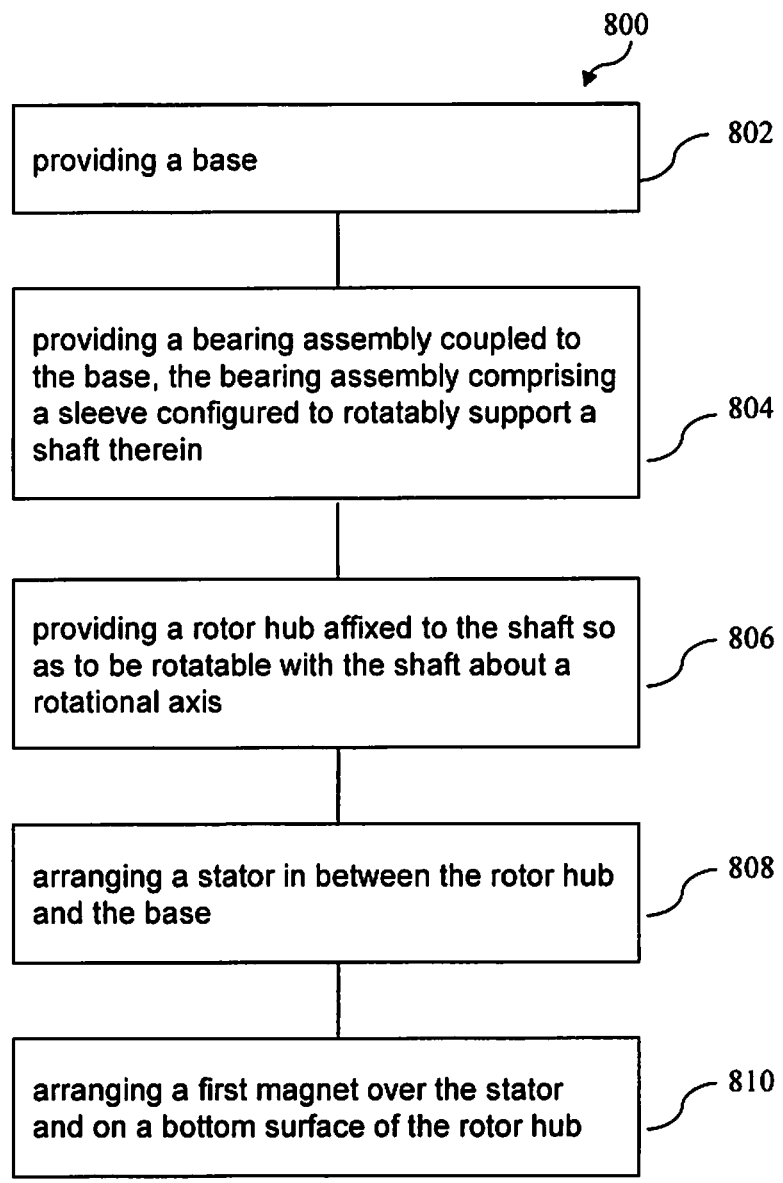
FIG. 8 depicts an overview of a method of fabricating a spindle motor for a HDD according to an example of the present disclosure.

FIG. 8 depicts an overview of a method 800 of fabricating a spindle motor for a HDD according to an example of the present disclosure. The method 800 comprises providing a base 210 (step 802), providing a bearing assembly 212 coupled to the base 210, the bearing assembly 212 comprising a sleeve 214 configured to rotatably support a shaft 216 therein (step 804), providing a rotor hub 220 affixed to the shaft 216 so as to be rotatable with the shaft 216 about a rotational axis 230 (step 806), arranging a stator 240 in between the rotor hub 220 and the base 210 (step 808), and arranging a first magnet 250 affixed to the rotor hub 220 (step 810) (in particular, over the stator 240 and on a bottom surface 252 of the rotor hub 220). In particular, the rotor hub 220 comprise a body portion 260, a peripheral wall portion 262 extending from the body portion 260 in a direction towards the base 210, and a flange portion 264 having a disk seating surface 266 configured for supporting one or more disks thereon. Furthermore, the peripheral wall portion 262 is configured to at least partially surround the stator 240 in a radial direction. The method 800 may further comprise a step of arranging a bottom rotor 276 (with or without a bottom magnet 292) in between the stator 240 and the base 210. It will be appreciated that the above steps described are not limited to the order presented and may be performed in other order or combined as appropriate.

Figure 9:
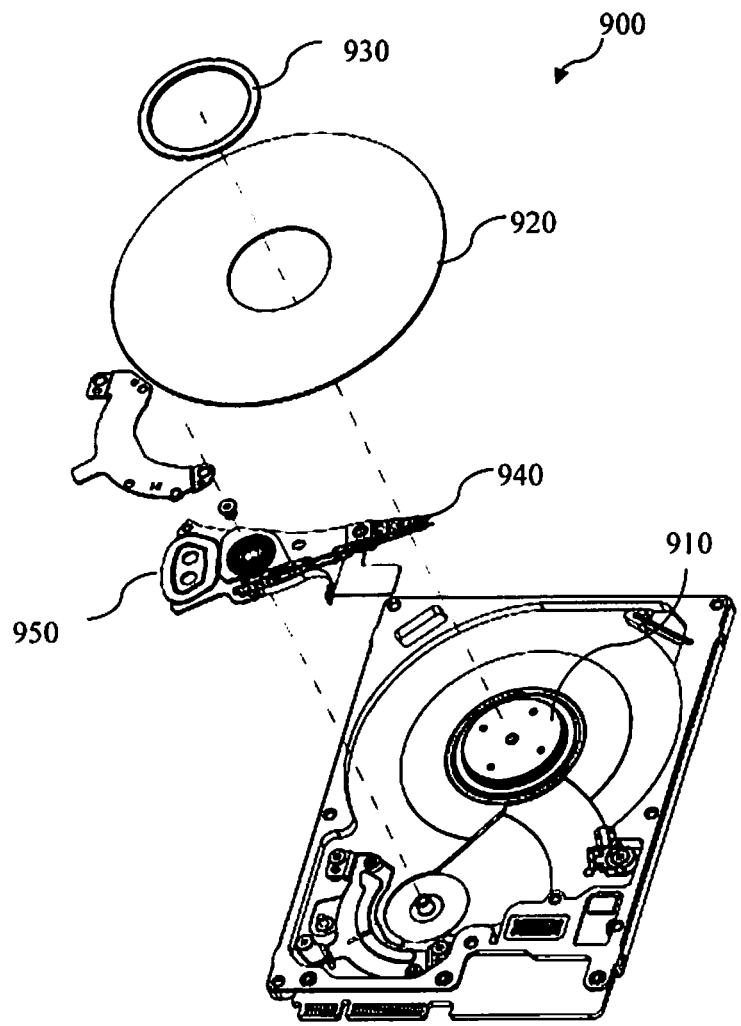
FIG. 9 depicts a schematic drawing of a HDD incorporating the spindle motor according to various examples of the present disclosure.

FIG. 9 depicts a schematic drawing of a HDD 900 incorporating the spindle motor as described herein according to various examples. The HDD 900 comprises a spindle motor 910 as described herein according to various examples for rotating one or more disks 920 (e.g., two disks) disposed thereon (e.g., using a clamp 930), a magnetic head 940 configured to read data from and writing data to the disk 920, and an actuator arm 950 having the magnetic head 940 disposed at a distal portion thereof, wherein the actuator arm 950 is configured to support and move the magnetic head 940 to a desired position above the disk 920.

While examples of the disclosure have been particularly shown and described with reference to specific examples, it should be understood that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A spindle motor for a hard disk drive, the spindle motor comprising:
    a base;
    a bearing assembly coupled to the base, the bearing assembly comprising a sleeve configured to rotatably support a shaft therein;
    a rotor hub affixed to the shaft so as to be rotatable with the shaft about a rotational axis;
    a stator arranged in between the rotor hub and the base; and
    a first magnet arranged over the stator and on a bottom surface of the rotor hub,
    wherein the rotor hub comprises a body portion, a peripheral wall portion extending from the body portion in a direction towards the base, and a flange portion having a disk seating surface configured for supporting one or more disks thereon, and
    wherein the peripheral wall portion is configured to at least partially surround the stator in a radial direction.

2. The spindle motor according to claim 1, wherein a plane of an upper surface of the body portion of the rotor hub and a plane of the disk seating surface defines a height spacing therebetween, and the peripheral wall portion is configured to extend in the direction towards the base to an extent sufficient for the height spacing to accommodate a plurality of disks.

3. The spindle motor according to claim 1, wherein the peripheral wall portion is configured to extend in the direction towards the base beyond the stator.

4. The spindle motor according to claim 1, wherein the stator comprises a substrate having a substantially circular planar cross-section and a plurality of coil windings formed on the substrate, and wherein a plurality of contacts configured for connecting with power lines are formed within an outer circumference of the substrate.

5. The spindle motor according to claim 4, wherein the plurality of contacts are formed between outer portions of adjacent coil windings.

6. The spindle motor according to claim 1, further comprises a second magnet arranged to oppose the first magnet, and wherein the stator is located between the first magnet and the second magnet.

7. The spindle motor according to claim 6, wherein the base comprises an outer protruding portion extending in a direction towards the rotor hub for supporting the stator, and wherein the stator is supported by the outer protruding portion at an outer peripheral portion of the stator.

8. The spindle motor according to claim 7, wherein a dimension of the second magnet is configured to define a predetermined radial gap to the outer protruding portion and/or a predetermined axial gap to the base for setting a magnetic preload to configure a bearing stiffness of the spindle motor.

9. The spindle motor according to claim 1, wherein the base comprises an inner protruding portion extending in a direction towards the rotor hub for supporting the stator, and wherein the stator is supported by the inner protruding portion at an inner peripheral portion of the stator.

10. The spindle motor according to claim 9, wherein a plurality of stators are affixed along the inner protruding portion of the base and a plurality of magnets are affixed along an outer peripheral wall portion of the rotor hub such that the plurality of stators and the plurality of magnets are interleaved alternately.

11. The spindle motor according to claim 10, wherein each of the plurality of magnets comprises one or more alignment markings on at least one of an outer periphery portion and an inner periphery portion thereof, and the plurality of magnets are aligned with each other to have the same polarity orientation.

12. A hard disk drive comprising:
the spindle motor according to claim 1 for rotating a disk disposed thereon;
a magnetic head configured to read data from and writing data to the disk; and
an actuator arm having the magnetic head disposed thereon at a distal portion thereof, wherein the actuator arm is configured to support and move the magnetic head to a desired position above the disk.

13. A method of fabricating a spindle motor for a hard disk drive, the method comprises:
providing a base;
providing a bearing assembly coupled to the base, the bearing assembly comprising a sleeve configured to rotatably support a shaft therein;
providing a rotor hub affixed to the shaft so as to be rotatable with the shaft about a rotational axis;
arranging a stator in between the rotor hub and the base; and
arranging a first magnet over the stator and on a bottom surface of the rotor hub,
wherein the rotor hub comprises a body portion, a peripheral wall portion extending from the body portion in a direction towards the base, and a flange portion having a disk seating surface configured for supporting one or more disks thereon, and
wherein the peripheral wall portion is configured to at least partially surround the stator in a radial direction.

14. The method according to claim 13, wherein a plane of an upper surface of the body portion of the rotor hub and a plane of the disk seating surface defines a height spacing therebetween, and the peripheral wall portion is configured to extend in the direction towards the base to an extent sufficient for the height spacing to accommodate a plurality of disks.

15. The method according to claim 13, wherein the peripheral wall portion is configured to extend in the direction towards the base beyond the stator.

16. The method according to claim 13, further comprises forming the stator to include a substrate having a substantially circular cross-section and a plurality of coil windings on the substrate, and forming a plurality of contacts configured for connecting with power lines and within an outer circumference of the substrate.

17. The method according to claim 16, wherein the plurality of contacts are formed between outer portions of adjacent coil windings.

18. The method according to claim 13, further comprises arranging a second magnet to oppose the first magnet, wherein the stator is located between the first magnet and the second magnet.

19. The method according to claim 18, further comprises forming the base to include an outer protruding portion extending in a direction towards the rotor hub for supporting the stator, wherein the stator is supported by the outer protruding portion at an outer peripheral portion of the stator.

20. The method according to claim 19, further comprising configuring a dimension of the second magnet to define a predetermined radial gap to the outer protruding portion and/or a predetermined axial gap to the base for setting a magnetic preload to configure a bearing stiffness of the spindle motor.

21. The method according to claim 13, further comprises forming the base comprises an inner protruding portion extending in a direction towards the rotor hub for supporting the stator, wherein the stator is supported by the inner protruding portion at an inner peripheral portion of the stator.

22. The method according to claim 21, further comprises affixing a plurality of stators along the inner protruding portion of the base and affixing a plurality of magnets along an outer peripheral wall portion of the rotor hub such that the plurality of stators and the plurality of magnets are interleaved alternately.

23. The method according to claim 22, further comprises:
forming one or more alignment markings on at least one of an outer periphery portion and an inner periphery portion of each of the plurality of magnets; and
aligning the plurality of magnets with each other to have same polarity orientation.

* * * * *